(12) United States Patent
Dayal et al.

(10) Patent No.: US 7,822,810 B2
(45) Date of Patent: Oct. 26, 2010

(54) METHOD AND SYSTEM FOR PEER TO PEER COMMON CHANNEL COLLABORATION

(75) Inventors: Umeshwar Dayal, Saratoga, CA (US); Qiming Chen, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1845 days.

(21) Appl. No.: 10/246,044

(22) Filed: Sep. 17, 2002

(65) Prior Publication Data
US 2004/0054723 A1 Mar. 18, 2004

(51) Int. Cl.
*G06F 15/16* (2006.01)
(52) U.S. Cl. .................... 709/204; 709/206
(58) Field of Classification Search .......... 709/201–207
See application file for complete search history.

(56) References Cited
U.S. PATENT DOCUMENTS

| | | | |
|---|---|---|---|
| 5,987,501 A * | 11/1999 | Hamilton et al. | 709/203 |
| 6,104,716 A * | 8/2000 | Crichton et al. | 370/401 |
| 6,314,465 B1 * | 11/2001 | Paul et al. | 709/226 |
| 6,578,066 B1 * | 6/2003 | Logan et al. | 718/105 |
| 2002/0103998 A1 * | 8/2002 | DeBruine | 713/153 |
| 2003/0101278 A1 * | 5/2003 | Garcia-Luna-Aceves et al. | 709/240 |
| 2003/0126213 A1 * | 7/2003 | Betzler | 709/206 |

OTHER PUBLICATIONS

The Gnutella Protocol Specification v0.4, Jun. 3, 2001.*
Google search for "define:associated".*

* cited by examiner

*Primary Examiner*—Yasin Barqadle

(57) ABSTRACT

A method and system for peer to peer common channel collaboration. The method includes exchanging collaboration messages between a plurality of proxies. The collaboration messages are configured for mediating communication between a corresponding plurality of servers. Each server is associated with a corresponding proxy. The execution of data transfers between the servers is controlled through a mediation implemented by the proxies.

21 Claims, 7 Drawing Sheets

METHOD AND SYSTEM FOR PEER TO PEER COMMON CHANNEL COLLABORATION

TECHNICAL FIELD

The present invention pertains to the field of digital systems. More particularly, the present invention relates to peer to peer communication and collaboration methods implemented on a distributed computer network.

BACKGROUND ART

Digital computers are being used today to perform a wide variety of tasks. Many different areas of business, industry, government, education, entertainment, and most recently, the home, are tapping into the enormous and rapidly growing list of applications developed for today's increasingly powerful computer devices.

One of the most popular applications of computer systems and computer implemented communication is the rapidly emerging field of electronic business applications, or "E-business" applications. E-business applications operate in a distributed environment involving multiple parties with heterogeneous application servers and systems. It is inappropriate to provide a single, centralized point of control for such applications, since the parties involved typically are independent business entities.

One recent prior art approach for implementing decentralized distributed computer environments involves the use of "peer-to-peer" methods. The peer-to-peer (P2P) interaction paradigm has become popular because it does not require centralized control. Traditionally, the P2P paradigm has been used for sharing resources (e.g., music files) among clients on behalf of individual consumers. Applying the P2P computing paradigm at the business level represents both opportunities and challenges. Many e-business applications (e.g., business intelligence, procurement) require bulk data transfer (large data files, XML documents, multimedia content), but prior art P2P methods have limited capacity and throughput for handling bulk content delivery.

Problems with the popular prior art P2P computing paradigm arise in cases where large amounts of information needs to be exchanged between two or more business entities (e.g., "peers"). For example, in a typical business intelligence service provisioning scenario, a client business contracts with a service provider to analyze large amounts of data collected from the client's operational systems. The objective of the analysis is to generate product recommendation rules, marketing promotions, fraud detection, risk analysis, or some other business intelligence functions. The transaction data, typically maintained in the client's operational databases, are transferred to a data analysis system and then summarized and analyzed using data analysis tools.

The data analysis ultimately results in business guidelines, such as, for example, aggregated information, association rules, promotion plans, fraud detection hints. Very often, such an analytic task is not a single step, but involves multi-step business conversations through message exchanges as well as content delivery between the operational system and the analysis system. Thus, the repeated exchange of large amounts of data between different business entities is not suited for the prior art P2P paradigm. This is especially so in a case where data needs to be exchanged across organizational or enterprise boundaries (e.g., across security barriers and firewalls).

Yet another problem with the use of the prior art P2P paradigm in a business setting is the manageability of peers. For example, in some P2P infrastructures such as Jxta™, peers can form ad hoc peer groups. However, when P2P protocols for inter-enterprise business interactions are applied, peer groups need to be allowed to be defined cognizant of the fact that there are organizational boundaries within enterprises. In the business intelligence service example above, the enterprise can include multiple servers and the organizational elements responsible for collecting client data may need to be separate from the organizational elements responsible for analyzing the client data.

Thus what is required is a solution that efficiently implements P2P collaboration in cases requiring the exchange of large data sets. What is required is a solution that manages data exchange between peers across different organizational or enterprise boundaries and efficiently implements peer management to facilitate business interactions. The present invention provides a novel solution to the above requirements.

DISCLOSURE OF THE INVENTION

A method and system for peer to peer common channel collaboration is disclosed. In one embodiment, the method includes exchanging collaboration messages between a plurality of proxies. The collaboration messages are configured for mediating communication between a corresponding plurality of servers. Each server is associated with a corresponding proxy. The execution of data transfers between the servers is controlled through a mediation implemented by the proxies.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODES FOR CARRYING OUT THE INVENTION

Embodiments of the present invention are directed towards a method and system for peer to peer common channel collaboration. In one embodiment, the method includes exchanging collaboration messages between a plurality of proxies. The collaboration messages are configured for mediating communication between a corresponding plurality of servers. Each server is associated with a corresponding proxy. The execution of data transfers between the servers is controlled through a mediation implemented by the proxies. Thus embodiments of the present invention efficiently implement P2P collaboration in cases requiring the exchange of large data sets, since the control and management of the data transfer occurs using a collaboration channel between the proxies while the actual bulk data transfer itself occurs via a content delivery channel between the servers. The mediation processes implemented by the proxies are configured to manage server data exchange between server peers across different organizational or enterprise boundaries, for example, negotiating data transfers across firewalls. Additionally, the mediation processes implemented by the proxies efficiently implement peer management to facilitate business interactions.

Figure 1:
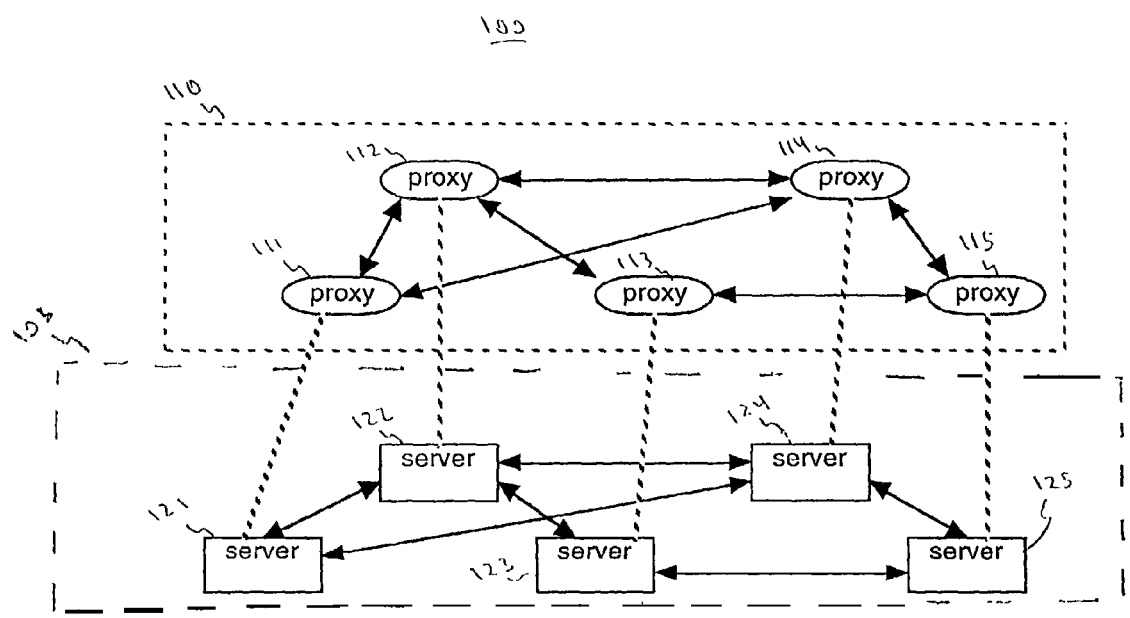
FIG. 1 shows a diagram of a peer to peer common channel collaboration system in accordance with one embodiment of the present invention.

FIG. 1 shows a diagram of a peer to peer common channel collaboration system 100 in accordance with one embodiment of the present invention. As depicted in FIG. 1, the system 100 embodiment includes a common channel collaboration network 110 comprising a plurality of proxies 111-115. The proxies 111-115 are communicatively coupled to one another via the connections of the common channel collaboration network 110. System 100 also includes a plurality of servers 121-125 coupled to each other via connections of a content delivery network 105. Each of the servers 121-125 is respectively coupled to a corresponding one of the proxies 111-115

The system 100 embodiment of the present invention implements a peer to peer common channel collaboration process by controlling the transfer of data between servers through a mediation and arbitration process implemented through a network of proxies. In the present embodiment, the process includes exchanging collaboration messages between proxies 111-115 via the communications links between the proxies 111-115 (e.g., via the collaboration network 110). The collaboration messages are configured for mediating communication between the corresponding plurality of servers 121-125. Each of the servers 121-125 is associated with a respective corresponding proxy 111-115. The exchange of data between the servers 121-125 occurs across the network communications links between the servers, as shown in FIG. 1. The network of communications links between the servers is referred to as a content delivery network 105, or content delivery channel 105. The control and mediation of the data transfers between the servers 121-125 is controlled through the proxies 111-115 via the separate collaboration network 110, or collaboration channel 110.

Thus, the system 100 embodiment of the present invention implements a P2P network communication process based on the principles of separating collaboration message delivery from content delivery, and using peer proxies to mediate inter-business interaction on behalf of the servers they represent, as well as to control content delivery between these servers. Collaboration message delivery occurs via the collaboration channel and content delivery occurs via the content delivery channel. Proxy peers mediate and control data transfers between their associated corresponding servers.

Accordingly, embodiments of the present invention implement two sets of protocols, a peer to peer protocol for message-based P2P interaction and a mediation protocol for controlling content delivery. A "Common Channel Collaboration Network", or C3net, (e.g., collaboration network 110) is the individual messaging network for inter-business collaboration, which is conceptually separate from the content delivery network 105. The C3net 110 is composed of a plurality of autonomous and communicating systems (e.g., proxies 111-115) used to mediate, represent, or work on behalf of actual servers (e.g., servers 121-125). The C3net proxies 111-115 perform message-based inter-business collaboration using C3net peer protocols, and control content delivery using the C3net mediation protocols. This process is illustrated in FIG. 1 with the communications links between proxies 111-115 of the C3net 110, the communications links between the servers of the content delivery network 105, and the links relationships between the proxies 111-115 and their corresponding servers 121-125.

With respect to the peer to peer messaging protocols, the P2P protocols are designed for pervasive peer-to-peer (P2P) network computing, wherein they standardize the way in which proxies discover each other, communicate with each other, monitor each other, join or leave domains, advertise and discover their capabilities and the network resources they mediate. With respect to the mediation protocols, the mediation protocols are designed for coupling a proxy and a server such as setting up connection, requesting downloading, etc. The mediation protocols differentiate $C^3$net from other P2P systems and agent systems. Proxies may have different extensible implementations but, at a minimum, must be capable of supporting these $C^3$net protocols. High-level protocols such as those for inter-business collaboration can be added.

The infrastructure of system 100 thus allows collaboration messages to be consolidated and sent over their own channel, separate from the content delivery network. It should be noted that as used herein, the term "channel" or "network" as used with respect to the content delivery channel/network vs. the collaboration channel/network is conceptually related to time, space, frequency or code division. Thus, on the one hand, the proxies 111-115 are free of capacity limitations for bulk content delivery, and on the other hand, the servers 121-125 can be liberated from handling various interaction functions, leading to more efficient use of the content delivery trunks.

In this manner, embodiments of the present invention efficiently implement P2P collaboration in cases requiring the exchange of large data sets, since the control and management of the data transfer occurs using a collaboration channel between the proxies while the actual bulk data transfer itself occurs via a content delivery channel between the servers. Thus the scalability of present invention is much better than prior art P2P implementations, which, for example, provide no notion of using peers to mediate servers and provide no separation between peer messaging and content delivery, and do not support mediation protocols.

Referring still to FIG. 1, as described above, the collaboration network 110, or $C^3$net 110, comprises the communicating proxies 111-115 that mediate the real, networked systems and services, and conduct message-based inter-business collaboration on behalf of the servers 121-125. The proxies 111-115 can be implemented in a number of different manners so long as they support the same $C^3$net protocols. As the proxies 111-115 are consolidated to message based interaction without dealing with content delivery, they can be designed to have moderate throughput. On the other hand, servers 121-125 can be liberated from handling interaction protocols, and data trunks can be consolidated for content delivery (e.g., high bandwidth). For example, in a case where two proxies, representing a database server and a data analysis server respectively, had multiple round negotiations on a data analysis task, after they settled an agreement, they setup the connection between the database server and the data analysis server for bulk data transferring. The separation of collaboration messaging and content delivery makes both efficient.

In one embodiment, the proxies 111-115 are implemented as autonomous systems that represent, or work on behalf of a server, i.e., a virtual or physical device, such as a computer, a data store, a database server, etc. The relationship between a proxy and the server it mediates can be made static or dynamic, and they may reside on the same or different platforms. The proxies interact to each other under a set of Peer Protocols (PP), and interact with the servers they represent under the a Mediation Protocols (MP). Additionally, the functionality of a given proxy can be extended by loading programs for supporting high-level inter-business interaction protocols such as ebXML and others.

Embodiments of the present invention can include three functional types of proxies, Service Interaction Proxy (SIP), Service Coordination Proxy (SCP), and Service Brokering Proxy (SBP). Depending on the requirements of a particular embodiment, a proxy has a fixed part as its basic architecture, and a changeable part to hold extension capabilities (e.g., Java programs for capability extension, etc.). The basic architecture of SIP, SCP and SBPs are substantially the same. The different functions they provide, are supported by the extension capabilities (e.g., loaded Java programs and servelets, etc.).

The resources of a proxy include its properties, such as name, addresses, capabilities, status, etc., and the server it represents. The resources also include data and program objects or their descriptions (e.g. the URL of a program class). In one embodiment, a proxy can carry Java classes and instances including language interpreters, files, business processes, etc. The resources also include the services a proxy provides or advertises. A service is described by its name, the URL from which it can be run or downloaded, the class, the arguments bindings, etc. The access method of a service may refer to a WSDL, ebXML, etc., depending on the supports made available. Multiple access methods may be made available. A proxy uses advertisement to describe and expose its resources, or the resources of a domain if it is a coordinator of the domain. In one embodiment, an advertisement is represented as an XML document composed of a series of hierarchically arranged elements. Each element can contain its attributes or additional elements. Typically, attributes are name-value pairs.

Figure 2:
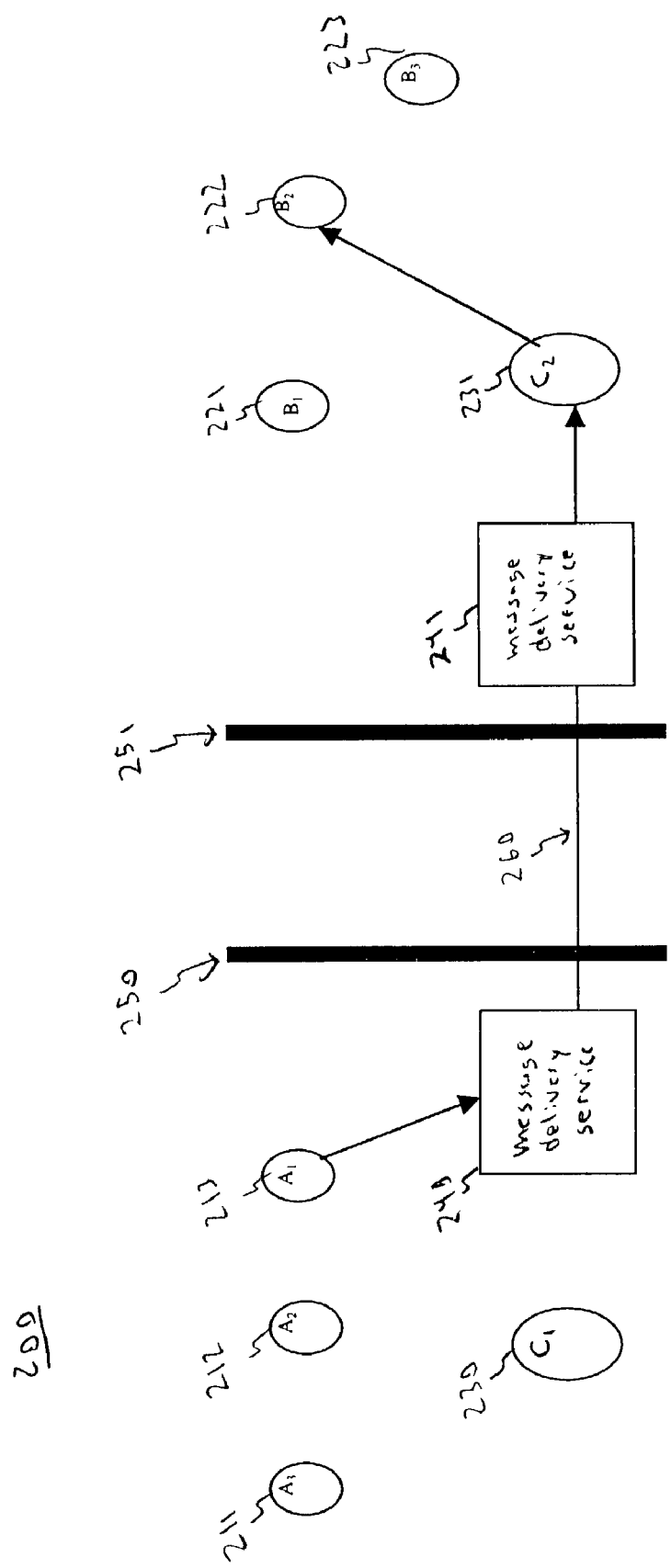
FIG. 2 shows a diagram of a domain system of proxies configured into a first and second domain in accordance with one embodiment of the present invention.

FIG. 2 shows a diagram of a domain system 200 of proxies configured into a first and second domain in accordance with one embodiment of the present invention. As depicted in FIG. 2, system 200 includes a first domain comprising proxies 211-213, a coordinator proxy 230, and a message delivery service component 240 on the left side of a firewall 250. A second domain comprising proxies 221-223, proxy coordinator 231, and a message delivery service 241 is shown on the right side of a firewall 251. The first and second domains are communicatively coupled via a network communications link 260 (e.g., the Internet, Intranet, etc.).

The system 200 embodiment shows the first and second domains separated by the firewalls 250-251. Proxies typically form domains for business reasons, such as based on organization boundaries, security considerations, and the like. A proxy domain includes multiple proxies, such as the proxies 211-213 of the first domain and the proxies 221-223 of the second domain. Grouping proxies together is generally based on organization boundaries, common interests, security consideration, etc. Each domain has a coordinator that is a SCP (e.g., coordinator $C_1$ 230 and coordinator $C_2$ 231). The coordinator provides a set of core domain services such as a local naming service for members to register, to discover each other by local names, to monitor each other, etc. The coordinator also provides directory service as well as access control on certain resources. For example, if a proxy is instructed to load a program but the address is not given, it consults the coordinator or the request sender to obtain the address. Additional domain services can be provided. A proxy not belonging to any domain is called a singleton proxy, and may be treated as the coordinator of itself in certain situation such as resource discovery.

The delivery of domain services and resources is coordinated through the domain coordinators $C_1$ 230 and $C_2$ 231. For example, FIG. 2 illustrates a case where message delivery services 240 and 241 are provided to the domain proxies $A_1$ 213, $A_2$ 121, and $A_3$ 211, and $B_1$ 221, $B_2$ 222, and $B_3$ 223 respectively by coordinators $C_1$ 240 and $C_2$ 241. FIG. 2 shows an instance where proxy $A_1$ 213 transmits a message using the message delivery service 240 to the proxy $B_2$ in the different domain. The proxy $A_1$ 211 access the message delivery service 240 and transmits across firewalls 250 and 251. In the other domain, the coordinator $C_2$ 231 coordinates with the message delivery service 241 to relay the transmission to the intended recipient, proxy $B_2$ 222.

Referring still to FIG. 2, inside a domain, brokering services may be provided by SBPs as special proxies. For example, a resource-broker can be implemented to maintain a hierarchically structured proxy capability registry. A request-broker can be used to isolate the service requesters from the service providers (i.e. proxies that carry the services) allowing an application to transparently make requests for a service. An event-broker delivers events to event subscribers from event generators. A connection-broker provides the relay service for routing messages between proxies if they cannot make a connection directly.

Domains may form hierarchies with coordinators at multiple levels. A significant feature of proxy-domains is that they can be formed dynamically. A proxy can join multiple domains in addition to one primary domain. Protocols are provided for a proxy to join, quit a domain, and switch its primary domain.

Within a domain, each proxy can be uniquely identified by its symbolic name. The coordinator (e.g., $C_1$ 230 and $C_2$ 231) maintains the proxy name registry and, optionally, other registries. Each proxy can keep an address-book, recording the addresses of its proxies that have become known to it, and are known to be alive.

With respect to communication across the firewalls 250 and 251, when proxies communicate across domain boundaries, they use a domain mechanism wherein the name of a proxy has two parts: a domain name; and a unique local name of the C3 proxy within the domain. For example, the name of the domain can be the name of its coordinator in a manner analogous to a gateway to the domain. An example of a domain name can be "corp.hp.com". The unique local name of the proxy within such a domain can be, for example, "corp.hp.com/infojet_proxy". In an intra-domain message, the destination can be simply expressed by the receiver's name.

In the present embodiment, the address of a proxy encapsulates the transport protocol. As a proxy can communicate with others under multiple transport protocols, it has multiple addresses (i.e. endpoints) corresponding to these protocols. For example, a proxy has an address list including "tcp://123.456.78.90:1234" and "http://qiming.hpl.hp.com:5678".

For inter-enterprise message delivery, the message delivery services 240 and 241 can be implemented as "CORBA-like" services, wherein it is only necessary to register the messaging service of the coordinator of a domain. This service then becomes the single entrance to the domain, and the coordinator can forward messages to other proxies, as illustrated in FIG. 2.

With respect to the actual messages transmitted between proxies (e.g., proxy $A_1$ 213 to proxy $B_2$ 222), in the present embodiment, the messages are implemented as an XML document with two major parts: the envelope part and the content part, an example of which is illustrated below.

```
<? xml version" 1.0" encoding" UTF- 8>
<C3message>
<AccessKey> Access-key </AccessKey>
<InteractKey> Interact-key, may be used in content as well </InteractKey>
    <Sender> Source C3proxy name </Sender>
    <Receiver> Target C3proxy name or name list (alias) </Receiver>
    <ForwardedTo> forwarded to </ForwardedTo>
    <Interpreter> Message interpreter </Interpreter>
<content>
        <Ping>
            <Option> type of ping requested/Option>
        </Ping>
    </content>
</C3message>
```

It should be noted that as used in the message shown above, an access key is a token used to grant message exchange. When presented in a message body an access-key is used to identify a sender and to verify the sender's right to send the message. Various metadata can be added to XML messages, such as certificates, public keys, etc. An interact-key is used to identify an interaction between proxies. An interaction can be a conversation, a logical instance of a collaborative process, etc. The messages exchanged during an interaction, such as the execution of a collaborative process, are marked by a unique interaction-key. Additionally, it should be noted that a proxy in accordance with embodiments of the present invention should support multiple transport protocols (e.g. HTTP, TCP), and be able to flexibly load and automatically switch message interpreters in order to process messages on different protocols. For example, a message can explicitly encapsulate the information on which interpreter is used, in order to be processed appropriately.

Figure 3:
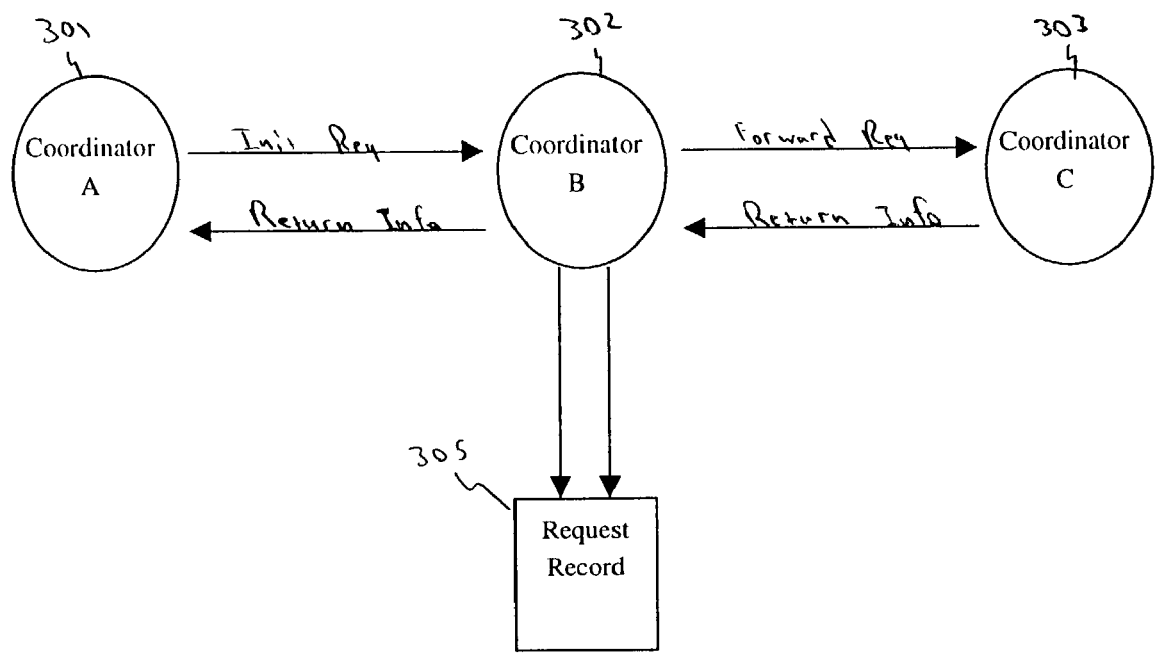
FIG. 3 shows a diagram of a domain service discovery system in accordance with one embodiment of the present invention.

FIG. 3 shows a diagram of a domain service discovery system 300 in accordance with one embodiment of the present invention. System 300 shows coordinators A 301, B 302, and C 303 participating in a resource/service discovery process.

In the present embodiment, the C3net P2P protocols provide mechanisms to discover the resources and services provided by other proxies. Discovering the resources of other proxies is made in a peer-to-peer fashion using a protocol for a distributed parallel search without central engine and directory. This protocol is domain-oriented where a discover request is broadcasted to the coordinators of accessible domains first and then to the member proxies of these domains. Such a process spreads until the target, or a forward limit, is reached. The selection of domains can make a discovery more focused.

FIG. 3 illustrates an example resource/service discovery process. For example, a coordinator A 301 discovers a resource held by another coordinator C 303 by issuing a initial discovery request message, Init Req. This initial request propagates it to the domain coordinators it knows, such as coordinator B 303, as well as any singleton proxies. The Init Req message contains the information of A 301 as the request initiator to be responded to. Each discovery request also has a unique request identifier (interaction key).

A coordinator, such as coordinator B 302, who received the discovery request, will send discovery response message to the request initiator directly with the advertisement of the requested resource if it has the requested resource, otherwise B 302 will forward the discovery request to all the proxies that are the primary members of its domain, using the same request identifier and referring to A as the request initiator. If B 302 found a domain member has the resource, B 302 will get the answer and send a discover response message to A, otherwise B 302 will forward the discover request to other coordinators and singleton proxies it knows, such as C 303. A request being routed through a coordinator is logged, such as request record 305, thus a forwarded request will not be re-forwarded.

The discovery process continues until one proxy has the answer or the request dies. A request has a time-to-live (TTL) value. At each hop (re-broadcast) the TTL is decremented. As soon as a coordinator proxy sees a request with expired (zero) TTL, it drops the request, to avoid it being propagated infinitely. Once the target proxy having the answer is found, the original requesting proxy A attempts to make a direct connection to the target proxy, in order to send a query message or so. Proxies in accordance with one embodiment of the present invention are capable of supporting these C3net protocols. Other extensions are possible. High-level protocols such as those for inter-business collaboration can be added.

With respect to protocols, specific protocols are referred to as a part, in-line with the convention of telecommunication terminology, meaning that a message can carry information under multiple protocols. The C3net peer protocols include the following parts.

Proxy Grouping Part (PGP) is the protocol for proxies to join or quit a proxy domain. A single proxy can belong to multiple proxy domains.

Proxy Advertisement Part (PAP) is the protocol for a proxy to advertise its own resources.

Proxy Discovery Part (PDP) is the protocol for a proxy to discover the resources from other proxies.

Proxy Query Part (PQP) is the protocol for a proxy to send a query to one or more proxies, and receive a response (or multiple responses) to the query.

Proxy Clone Part (PCP) is the protocol for a proxy to inherit the capabilities of another to become the clone of the latter in the same domain.

Proxy Observation Part (POP) is the protocol for a proxy to obtain status information about other proxies, such as state, uptime, traffic load, capabilities, etc.

Proxy Event Part (PEP) is the protocol for event registration, subscription and distribution.

Proxy Routing Part (PRP) is a set of request/response messages for a connection broker to route messages to its destination.

The content of an example discovery request message and discovery response message are illustrated below.

```
<DiscoveryRequest>
    <RequestId> request id </RequestId>
    <Type> type of request </Type>
        <InitProxy> C3proxy name of initial requestor </InitProxy>
        <Query> query string </Query>
</DiscoveryRequest>
<DiscoveryResponse>
    <RequestId> request id </RequestId>
    <Type> type of request </Type>
```

-continued

```
<InitProxy> C3proxy name of initial requestor </InitProxy>
<ResultCount> number of responses </ResultCount>
<Result> resource advertisement response </Result>
  ...
</DiscoveryResponse>
```

Figure 4:
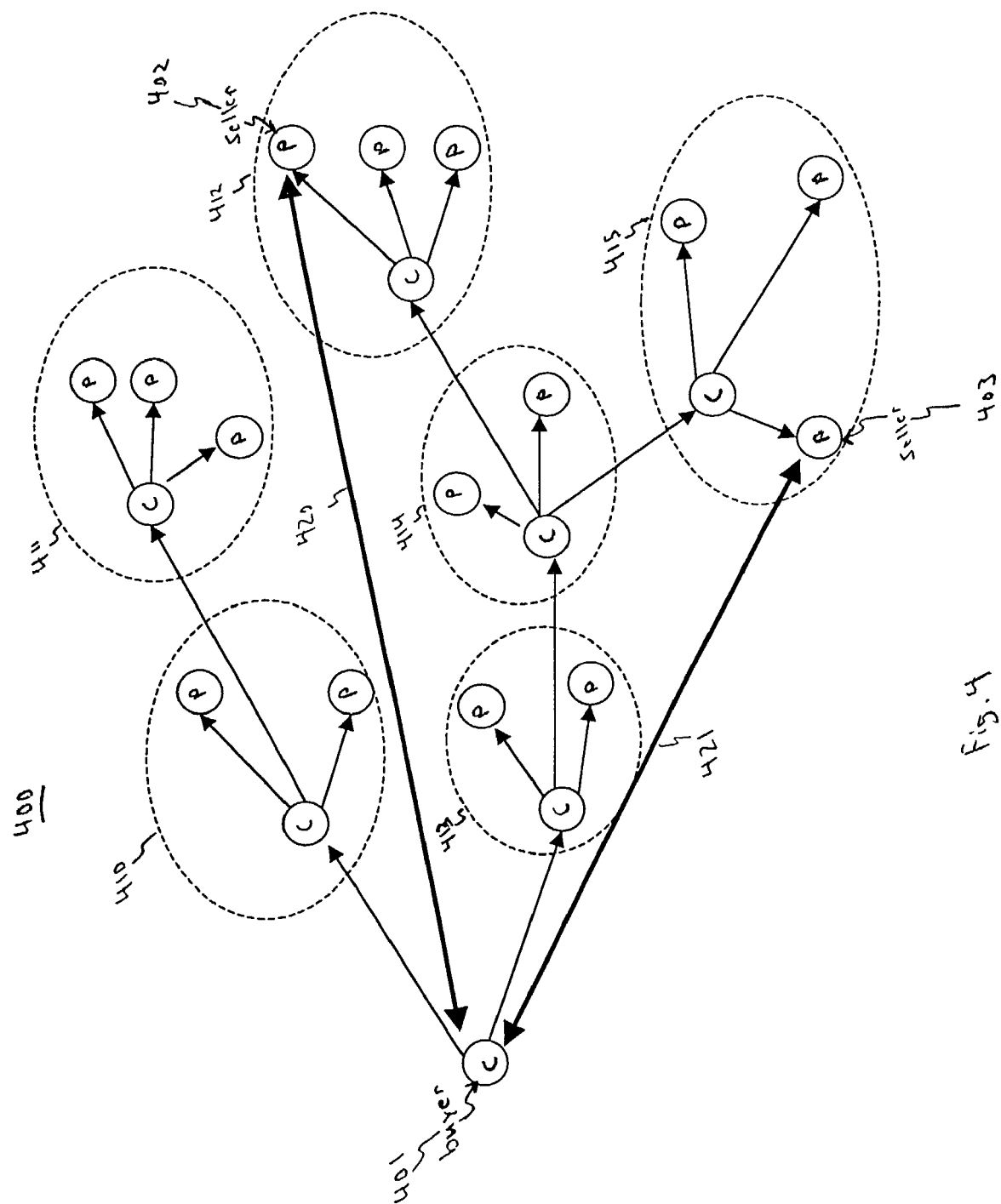
FIG. 4 shows a diagram of a high level discovery process as implemented using discovery request and discovery response mechanisms in accordance with one embodiment of the present invention.

FIG. 4 shows a diagram of a high level discovery process 400 as implemented using discovery request and discovery response mechanisms in accordance with one embodiment of the present invention. As depicted in FIG. 4, a buyer proxy 401, in this case a coordinator proxy, uses the discovery protocols of the present invention to query the coordinator proxies of a plurality of domains 410-415 known to the buyer proxy 401.

In the present embodiment, as described above, the buyer proxy 401 issues a discovery request message and propagates the message to the domain coordinators it knows, as shown in FIG. 4. The discovery request message is subsequently relayed, in turn, to the coordinator proxies of the adjacent domains. The relaying continues until the discovery request message reaches a seller proxy 402 and a seller proxy 403 (e.g., which have the requested item, goods, service, etc. for sale). The seller proxy 402 and 403 then send a discovery response message directly back to the request initiator, in this case the buyer proxy 401, and direct two-way communication then ensues (as indicated by the lines 420 and 421).

Figure 5:
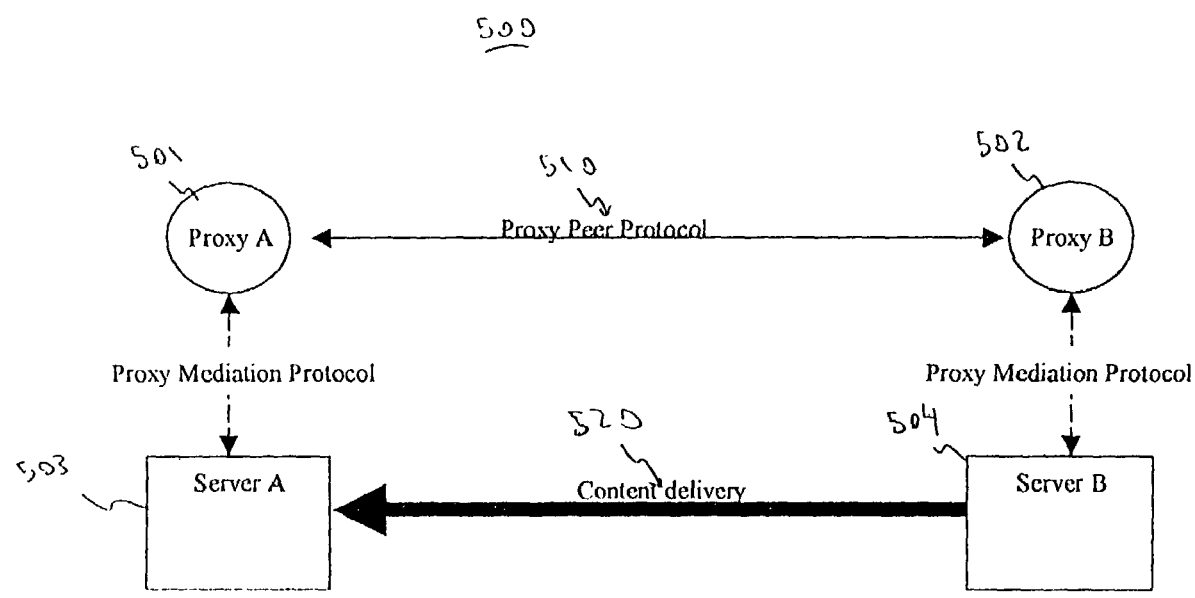
FIG. 5 shows a diagram of a proxy mediation protocol process in accordance with one embodiment of the present invention.

FIG. 5 shows a diagram of a proxy mediation protocol process 500 in accordance with one embodiment of the present invention. As depicted in FIG. 5, proxies 501 and 502 are shown communicating using a proxy peer protocol 510 to implement mediation of a data transfer. Proxies 501 and 502 are shown communicating with their respective servers 503 and 504 using a proxy mediation protocol. The result of the mediation is a content delivery data transfer 520.

Proxies 501 and 502 interact with the servers 503 and 504 they represent under the $C^3$net mediation protocols. With regard to the interaction between these servers, the focus is on content delivery, and it is assumed that the collaboration between them is dealt with by the proxies 501 and 502 in the collaboration channel (e.g., proxy peer protocol 510), separated from content delivery channel (e.g., content delivery 520).

It should be noted that a proxy in accordance with the present embodiment and the server it represents can reside on the same or different computer system platforms. When the proxy and the server are separated, a system component with the capability of acting on the mediation protocols, referred to as a proxy adapter in one implementation, is installed on the server platform. Otherwise the functions of a proxy adapter may be loaded onto a proxy.

When the proxy (e.g., proxy 501) and the server (e.g., server 503) are on separate platforms, the mediation protocol is implemented in terms of messages between the proxy and the proxy adapter, including the corresponding APIs (with return objects) provided by the message interpreter of the proxy adapter. When the proxy and the server are on the same platform, the mediation protocol may be implemented either in terms of messages, or directly in terms of APIs.

Referring still to FIG. 5, in a case where proxy 501 and proxy 502 represent server 503 and server 504 respectively, and where the proxies 501 and 502 have reached a content delivery agreement (e.g., proxy 501 has obtained the connection information/advertising from proxy 502) the content delivery 520 can be set up in a number of different ways. One way to setup content delivery 520 is that proxy 502 knows, or managed to have the content stored in a file, and sends proxy 501 the location of the file and the information for connection (e.g. a connection string). Proxy 501 (possibly via a proxy adapter) then activates a download facility at the proxy 501 side to make a connection and download the file. In a case where the file is behind a firewall, proxy 501 sends proxy 502 a request to upload the file. At the proxy 501 side, proxy 501 and its proxy adapter interact under the mediation protocol in the following way.

In one embodiment, after obtaining the connection information from proxy 502, proxy 501 sends a connected request message to the proxy adapter on the proxy 501 side, to have an FTP-like download facility contact server 504. When the proxy adapter on the proxy 501 side receives the connection certification, it replies to proxy 501 with the connection status, or an error code indicating "NOT FOUND" or the like.

Another way to setup content delivery involves transferring executable Java objects, i.e. classes of Java programs. In this case proxy 501 is informed of the location of the class file as well as the connection information, and has a loader activated to load the class for making an instance to execute. In this manner, the mediation protocol of the present embodiment is a customizable protocol compatible with several implementations, as suited for the particular requirements of applications such as file sharing, database linkage, and the like.

Figure 6:
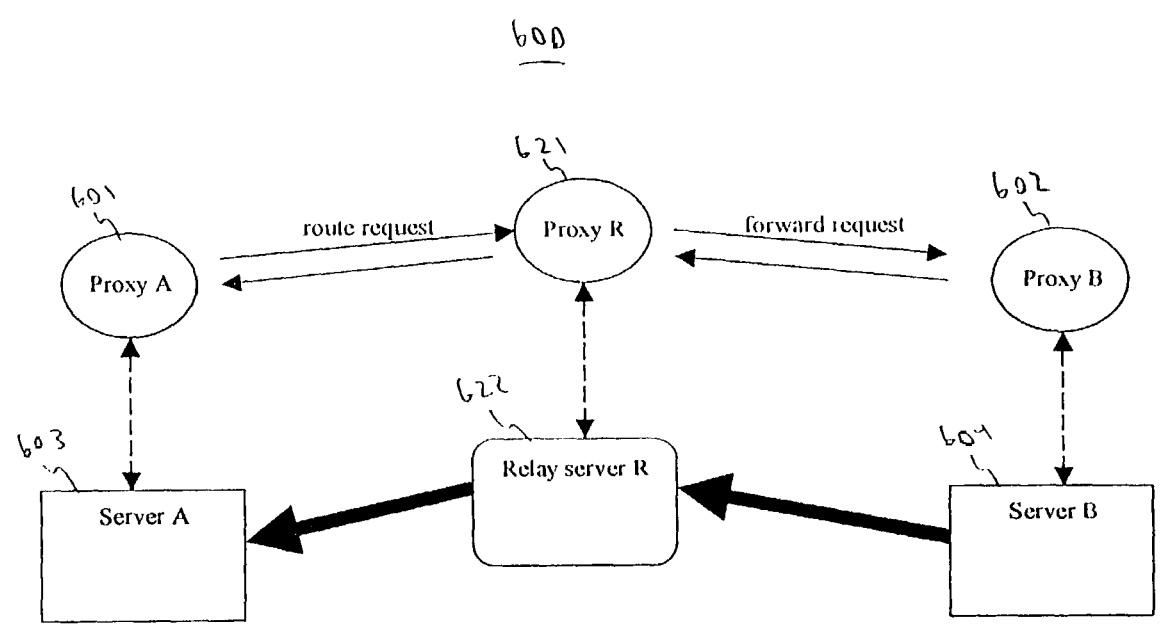
FIG. 6 shows a diagram of a proxy mediation protocol process in accordance with one embodiment of the present invention when the proxies are separated by a firewall.

FIG. 6 shows a diagram of a proxy mediation protocol process 600 in accordance with one embodiment of the present invention. Process 600 shows a case where a relay proxy 621 and a relay server 622 is used to implement a data transfer where the source server 604 is separate from the destination server 603 across a firewall. In such an implementation the relay proxy 621 allows the proxies 601 and 602 to communicate across a firewall to setup the content delivery transfer. The content delivery data transfer is otherwise similar to the data transfer described above in the discussion FIG. 5.

Figure 7:
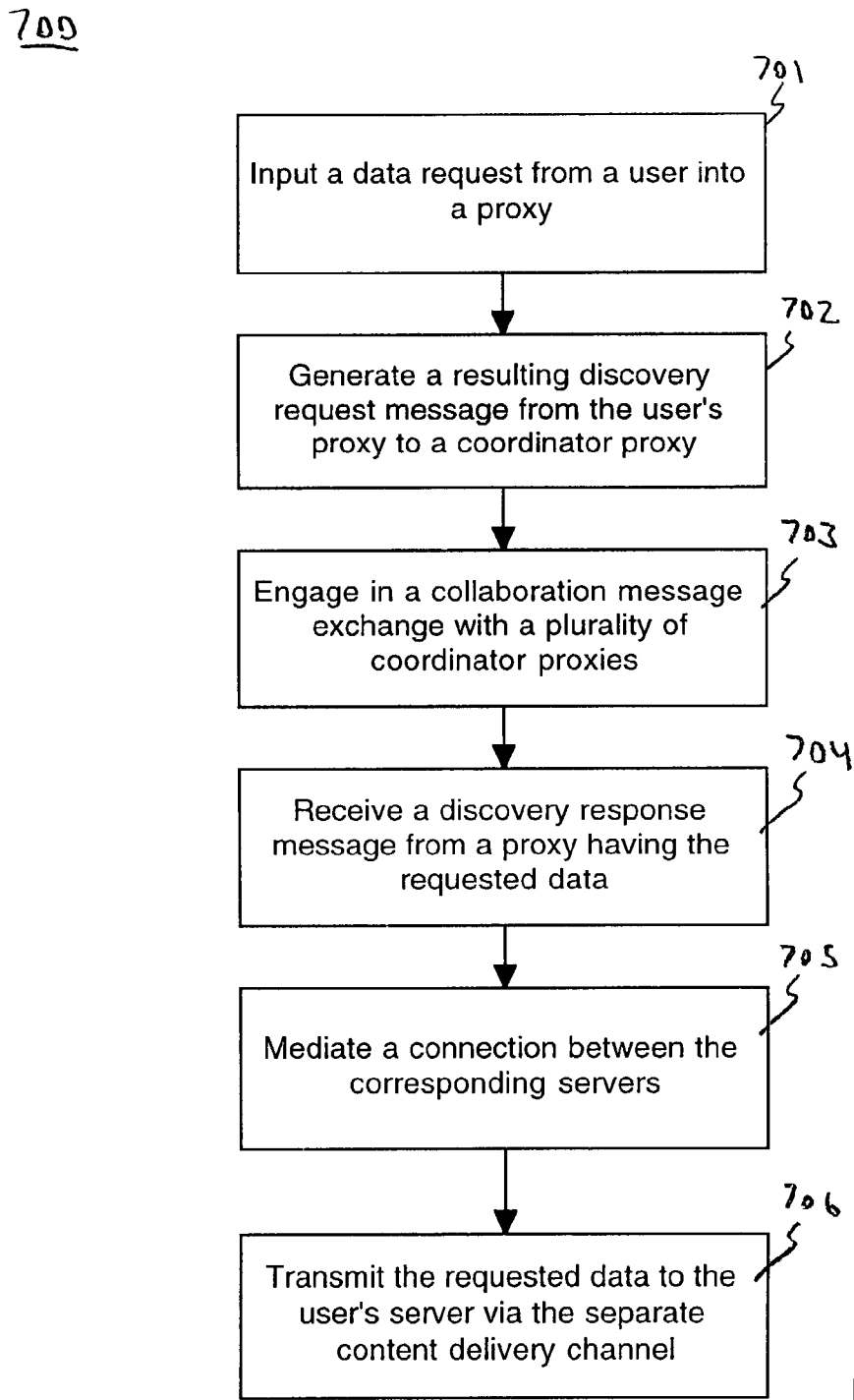
FIG. 7 shows a diagram of a flowchart of a peer-to-peer common channel collaboration process in accordance with one embodiment of the present invention.

FIG. 7 shows a diagram of a flowchart of a peer-to-peer common channel collaboration process 700 in accordance with one embodiment of the present invention. As depicted in FIG. 7, process 700 shows the steps involved in initiating, setting up, and executing a peer-to-peer content delivery data transfer.

Process 700 begins in step 701, where a data request is input by a user. In step 702, the data request results in a discovery request message being transmitted from the user's proxy to a coordinator proxy of the user's domain. In step 703, the coordinator proxy of the user's domain engages in a collaboration message exchange with a plurality of proxies and adjacent domains (e.g., other coordinator proxies known to the user's coordinator proxy, etc.). In step 704, a discovery response message is received by the user's coordinator proxy from a proxy having the requested data. In step 705, a connection is mediated (e.g., using mediation protocols) between the server corresponding to the user's proxy and the server corresponding to the proxy having the requested data. Then in step 706, the requested data is transmitted to the user's server via the separate content delivery channel as described above.

Thus, embodiments of the present invention, a method and system for peer to peer common channel collaboration, have been described. The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order best to explain the principles of the invention and its practical application, thereby to enable others skilled in the art best to use the invention and various embodiments with various modifications as are suited to the particular use contemplated. It is intended that the scope of the invention be defined by the Claims appended hereto and their equivalents.

What is claimed is:

1. A method for peer to peer common channel collaboration, comprising:
    exchanging collaboration messages between a plurality of proxies, the collaboration messages configured for mediating communication between a corresponding plurality of servers, wherein each server is associated with a corresponding proxy;
    executing a plurality of data transfers between the servers, wherein the data transfers are controlled through mediation implemented by the proxies without requiring the data to be transferred through the proxies;
    configuring a number of proxies, out of the plurality of proxies, as a domain; and
    designating at least one of the number of proxies as a domain coordinator to coordinate services for the domain.

2. The method of claim 1 wherein the collaboration messages for the proxies are exchanged over a collaboration channel and the data transfers between the servers are transferred over a content delivery channel.

3. The method of claim 1 wherein the proxies are configured to exchange the collaboration messages in accordance with a peer to peer protocol.

4. The method of claim 1 wherein the proxies are configured to control the servers by communicating with the servers in accordance with a mediation protocol.

5. The method of claim 1 further comprising:
    forming the domain dynamically by configuring the number of proxies into the domain dynamically.

6. The method of claim 1 further comprising:
    configuring the number of proxies as the domain in accordance with an organizational boundary.

7. The method of claim 1 further comprising:
    configuring the number of proxies as the domain in accordance with a security condition.

8. A system of peer to peer common channel collaboration, comprising:
    a plurality of proxies communicatively coupled via a collaboration channel, the proxies configured for exchanging collaboration messages via the collaboration channel;
    a plurality of servers communicatively coupled to the proxies, wherein each of the servers is associated with a corresponding proxy, the collaboration messages configured for mediating communication between the servers by controlling data transfers between the servers without requiring the data to be transferred through the proxies;
    a domain including a number of proxies, out of the plurality of proxies; and
    a domain coordinator included in the domain for coordinating services for the domain, the domain coordinator implemented by at least one of the number of proxies included in the domain.

9. The system of claim 8 wherein the collaboration messages for the proxies are exchanged over the collaboration channel and the data transfers between the servers are transferred over a content delivery channel.

10. The system of claim 8 wherein the proxies are configured to exchange the collaboration messages in accordance with a peer to peer protocol.

11. The system of claim 8 wherein the proxies are configured to control the servers by communicating with the servers in accordance with a mediation protocol.

12. The system of claim 8 wherein the domain is adapted to enable dynamic configuration, wherein the number of proxies in the domain is configured dynamically.

13. The system of claim 8 wherein the domain is adapted to enable organizational boundary configuration, wherein the number of proxies in the domain is configured in accordance with an organizational boundary.

14. The system of claim 8 wherein the number of proxies in the domain is configured in accordance with a security condition.

15. A system for peer to peer common channel collaboration, comprising:
    means for exchanging collaboration messages between a plurality of proxies, the collaboration messages configured for mediating communication between a corresponding plurality of servers, wherein each server is associated with a corresponding proxy;
    means for executing data transfer between the servers, wherein the data transfer is managed through mediation implemented by the proxies without requiring the data to be transferred through the proxies;
    means for configuring a number of proxies, out of the plurality of proxies, as a domain; and
    means for designating a number of the proxies as a domain coordinator to coordinate services for the domain.

16. The system of claim 15 wherein the collaboration messages for the proxies are transmitted via a collaboration channel and the data transfer between the servers is transmitted via a content delivery channel.

17. The system of claim 15 wherein the proxies are configured to transmit the collaboration messages using a peer to peer protocol.

18. The system of claim 15 wherein the proxies are configured to control the servers by using a mediation protocol.

19. The system of claim 15 further comprising:
    means for forming the domain dynamically by configuring the number of proxies into the domain dynamically.

20. The system of claim 15 further comprising:
    means for selecting the number of proxies for the domain in accordance with an organizational boundary.

21. The system of claim 15 further comprising:
    means for selecting the number of proxies for the domain in accordance with a security condition.

* * * * *